United States Patent
Fellert

(10) Patent No.: US 6,379,454 B1
(45) Date of Patent: Apr. 30, 2002

(54) FINISHING MORTAR FOR SOUND-ABSORBING COATING OF INNER WALLS, CEILINGS AND THE LIKE IN BUILDINGS

(76) Inventor: John Fellert, Reginsgatan 4, S-502 55 Borås (SE)

( * ) Notice: Subject to any disclaimer, the term of this patent is extended or adjusted under 35 U.S.C. 154(b) by 0 days.

(21) Appl. No.: 09/331,132

(22) PCT Filed: Dec. 12, 1997

(86) PCT No.: PCT/SE97/02072

§ 371 Date: Aug. 4, 1999

§ 102(e) Date: Aug. 4, 1999

(87) PCT Pub. No.: WO98/27027

PCT Pub. Date: Jun. 25, 1998

(30) Foreign Application Priority Data

Dec. 16, 1996 (SE) .............................................. 96045992

(51) Int. Cl.⁷ ................................................ G04B 14/00
(52) U.S. Cl. .................. 106/698; 52/145; 106/DIG. 2; 181/294; 252/378 P
(58) Field of Search ............................. 252/378, 378 P; 52/145; 181/294; 106/698, DIG. 2

(56) References Cited

U.S. PATENT DOCUMENTS

| | | | | |
|---|---|---|---|---|
| 4,911,788 A | * | 3/1990 | Pittman et al. | 162/145 |
| 5,071,511 A | * | 12/1991 | Pittman | 252/62 |
| 5,126,076 A | * | 6/1992 | Graf et al. | 252/604 |
| 5,498,384 A | * | 3/1996 | Volk et al. | 264/122 |
| 5,911,818 A | * | 6/1999 | Baig | 106/698 |
| 5,964,934 A | * | 10/1999 | Englert | 106/DIG. 2 |

FOREIGN PATENT DOCUMENTS

| | | | |
|---|---|---|---|
| DE | 26 20 865 | | 12/1976 |
| DE | 3829328 | * | 12/1989 |
| EP | 632101 | * | 1/1995 |
| JP | 196759 | * | 12/1982 |
| WO | 95/30804 | | 11/1995 |

* cited by examiner

Primary Examiner—Wayne Langel
(74) Attorney, Agent, or Firm—Lerner, David, Littenberg, Krumholz & Mentlik, LLP

(57) ABSTRACT

The invention relates to a finishing mortar for sound-absorbing coating of inner walls, ceilings and the like in buildings. It may be applied directly on concrete or some other carrying material or on underlying insulation material, such as mineral wool. The finishing mortar according to the invention is characterized in that it comprises cotton fibres and expanded mineral, such as perlite.

9 Claims, No Drawings

From the title: FINISHING MORTAR FOR SOUND-ABSORBING COATING OF INNER WALLS, CEILINGS AND THE LIKE IN BUILDINGS

TECHNICAL FIELD

The present invention relates to a finishing mortar for sound-absorbing coating of inner walls, ceilings and the like in buildings either directly on concrete or some other carrying material, but it may also be applied on underlying absorption material for sound such as mineral wool, polyester material, fibre board material and glass granulate.

PRIOR ART

Different buildings are constructed in different ways. They are large or small and made of such materials as stone, concrete, brick, wood, etc. resulting in different strength, heat insulation and sound absorption in walls, floors and ceilings. In buildings where the heat insulation ability and the sound absorption ability are unsatisfactory walls and ceilings may be covered with further material to improve these unsatisfactory properties. The ceiling is often lowered and the walls are built out, for example with cross bars and covered with a sound-insulating material. The material often consists of wood fibre board discs, minarite discs and gypsum and the insulation may consist of different porous materials such as mineral wool.

The work of improving buildings in this regard is often very expensive and even if the materials for the renovation may be good as such, they are often unsatisfactory in some regard, especially with regard to the sound absorption ability.

It has long been a problem during the building of new constructions and renovation of buildings to be able to line the walls and ceilings in such a way that the sound absorption will be satisfactory while at the same time an aesthetically attractive surface is obtained. This has often, especially in concert houses, conference halls, meeting halls, offices and the like, resulted in a non-uniform covering of the walls since the acoustics from certain walls must be different than from other walls and the like.

Through the international patent application WO 95/30804 a sound absorption system for inner walls, ceilings, etc. in buildings is known which is brought about by applying a first layer of mineral wool on a wall, a ceiling or the like, whereupon a second layer of cotton fibres is applied by spraying, coating or in some other way. The cotton fibres are applied from a water suspension which may also contain other materials such as textile fibres, cellulose fibres from coniferous trees, mica, biolite, etc.

Further suspensions for applying the second layer as above are known, namely such suspensions which are based on a finely ground mica mineral which is bound in an organic colorant or cellulose fibres from coniferous trees mixed with mineral fibres and colorants.

In DE 2 620 865 there is disclosed a composition of construction boards and a method of manufacuring such boards. A main compound in said composition is Portland cement and the production method involves drying and curing in an autoclave and, thus, such composition would not be useful for a mortar composition for in-situ use.

These above-mentioned materials, which may be good as such, can however be improved, especially with regard to sound absorption ability and crack formation and the products have therefore been developed further resulting in the present invention.

THE SOLUTION

Through the present invention the problems with the above materials have been solved and these have been improved by bringing about a finishing cement free mortar for sound-absorbing coating of inner walls and ceilings in buildings either directly on concrete or some other carrying material or on underlying insulation material such as mineral wool, which mortar is characterized in that it mostly comprises cotton fibres and expanded perlite, in the weight ratio between perlite and cotton of 10%–250%, preferably 80%.

According to the invention it is suitable that the perlite is present in fractions having a particle size of 0–1 mm, 0–3 mm or 0–5 mm.

According to the invention the expanded perlite should, before it is mixed in the finishing mortar, have a volume weight of 35–125 kg/m$^3$ depending on the particle size.

According to the invention the finishing mortar may also contain other additives such as textile fibres, plant fibres from coniferous trees, mica, biotite, muscovite or silicates or mixtures thereof in small amounts.

According to the invention it is suitable that the mortar is present as a water dispersion with a content of solids which makes it suitable for spraying or spreading, the content of solids then preferably being 200–300 g/l.

DETAILED DESCRIPTION

Expanded mineral such as perlite is produced by heating a mineral which contains water in a bound form after grinding of the mineral, the water then bringing about an expansion of the mineral, building both closed and open pores and with appreciably lowered volume weight. Such a mineral is perlite, the composition of which is as follows

| | |
|---|---|
| $SiO_2$ | 65–80% |
| $AL_2O_3$ | 12–16% |
| $Na_2O$ | 3–5% |
| $K_2O$ | 2–4% |
| CaO | 0–2% |
| $FE_2O_3$ | 1–3% |
| MgO | 0–1% |
| $H_2O$ | 2–6% in bound form |

The perlite is heated to a temperature in the order of 900° C. and the particles are then expanded from 4–20 times their original volume.

Perlite which is available on the open market is usually supplied in fractions having a size of 0–1 mm, 0–3 mm and 0–5 mm.

During admixing of this expanded material the air penetration of the mortar after drying will be maintained, which means that the acoustic properties, i.e. the damping of sound, also are better than for a coating based on only cotton fibres after drying.

The finishing mortar according to the present invention consists of a water dispersion of cotton fibres and expanded minerals, preferably perlite. The ratio of amounts between the cotton fibres and the perlite may vary within wide limits but a lower limit of 10% perlite in relation to cotton fibres calculated in weight could be used whereas an upper limit of 250% perlite in relation to cotton is a suitable limit. An amount of perlite in the region of 80% in relation to the cotton fibres should preferably be used.

Other substances may also be used to a lesser extent in the mortar such as, for example, textile fibres, plant fibres from coniferous trees, finely divided mica, biotite, muscovite or other silicates or mixtures thereof. None of these fillers are expanded and they should therefore be present to a lesser extent. Pigments giving a suitable colour may of course also be added.

The finishing mortar according to the invention can be applied either directly on concrete or on an underlying material such as mineral wool. The most convenient way of applying the mortar is by spraying. For this purpose the mortar should be very diluted having a solid content of about 200–300 g/l. The mortar according to the invention can also be applied by spreading or in another way. The coating of the mortar on the surface which is to be coated may occur in one or several steps with intermediate drying. The thickness of the dried coating may vary from 1 mm up to 10 mm. A thicker coating gives, of course, a greater sound damping. The particle size of the expanded perlite which is to be used may be chosen dependent upon the appearance of the surface which is to be produced. A smoother surface requires a smaller particle size than a rougher surface.

The sound damping effect of using the mortar according to the present invention compared to when no sound damping measure has been taken and to when a measure has been taken with a finishing mortar containing only cotton fibres according to the international patent application WO 95/30804 has been measured and is shown in the following table. The measurements have been made according to Swedish Standard SS 02 52 64 and ISO 354, which show lingering sound times in, seconds and practical absorption factor ap=per cent absorbed sound energy.

The measurements have been made before and after the measures taken. As a measure, a slotted disc 20 mm was mounted glued to a ceiling having about 3 mm cotton mortar and with 3 mm cotton mortar +perlite according to the present invention.

| Frequency Hz | E-time seconds before measure | E-time, seconds after measure | α | α, after measure according to present invention |
|---|---|---|---|---|
| 125 | 3.0 | 1.7 | 0.20 | 0.30 |
| 250 | 2.5 | 0.8 | 0.60 | 0.65 |
| 500 | 2.2 | 0.7 | 0.70 | 0.90 |
| 1000 | 2.2 | 0.7 | 0.60 | 0.80 |
| 2000 | 2.0 | 0.7 | 0.60 | 0.70 |
| 4000 | 1.5 | 0.6 | 0.70 | 0.75 |

As can be seen, a substantial improvement of the sound absorption results from the present invention also compared to finishing mortar containing only cotton fibres, which as such has very good values.

A further need of the invention comes from the demand from architects for after-treatment of the mortar materials, in the present case mechanical planing of the spray-applied surface to adapt the appearance to aesthetic requirements. When this occurs with all of the "acoustic mortars" available on the market, the mechanical treatment with buffing tools will wholly or partly compress the cavities which have promoted or been crucial for the acoustic properties. The expanded mineral grains of the present invention add a "constant porosity" to the mortar in that these bodies are still intact after the mechanical treatment and maintain the mortar layer "acoustically open" (see page 4, lines 14–18). They also have a distancing function so that the intermediate cotton mortar cannot be compressed as much as without the additive.

In the following table practical absorption ability $\alpha p$ is shown in a case with 3 mm cotton mortar applied on the underlying absorbent disc and mechanically planed with a buffing tool. And in the other case a 33% admixture of perlite is applied in three steps with intermediate mechanical planing for maximal compression. Measuring according to ISO 354.

| Frequency Hz | α with cotton mortar planed mechanically | α with addition of perlite planed mechanically |
|---|---|---|
| 125 | 0.40 | 0.40 |
| 250 | 0.55 | 0.65 |
| 500 | 0.75 | 0.90 |
| 1000 | 0.50 | 0.65 |
| 2000 | 0.25 | 0.55 |
| 4000 | 0.20 | 0.50 |

The coating which is brought about with the finishing mortar according to the present invention has a lesser tendency to shrinkage than coatings made from known mortars and has a higher elasticity. The decreased shrinkage tendency is probably due to the fact that the expanded mineral grains to some extent abut against each other and thus hinder the contraction of the coating. The coating is also very environmentally friendly and has an increased resistance against ignition.

The invention is not limited to the embodiments shown and thus can be varied in different ways within the scope of the claims.

What is claimed is:

1. Cement free finishing mortar for use as a sound-absorbing coating on the inner walls and ceilings of buildings consisting essentially of:

perlite; and cotton fibres, wherein a weight ratio of perlite to cotton fibres is in the range of 01 to 2.5 and said mortar is a water dispersion having a content of solids in the range of 200 to 300 g/l.

2. Mortar according to claim 1 wherein said weight ratio is 0.8.

3. Mortar according to claim 1 wherein said perlite has a particle size of less than 1 mm.

4. Mortar according to claim 1 wherein said perlite has a particle size of less than 3 mm.

5. Mortar according to claim 1 wherein said perlite has a particle size of less than 5 mm.

6. Mortar according to claims 3, 4, or 5, wherein a dry volume weight of said perlite is in the range of 35 to 125 kg/m$^3$ dependent on said particle size.

7. Mortar according to claim 1, further consisting essentially of an additive selected from the group consisting of textile fibres, plant fibres from coniferous trees, mica, biotite, muscovite, silicates, colour pigment and combinations thereof.

8. Mortar according to claim 1, wherein said mortar comprises a diluted sprayable solutions.

9. Mortar according to claim 1, wherein said mortar comprises a diluted spreadable solution.

* * * * *

UNITED STATES PATENT AND TRADEMARK OFFICE
CERTIFICATE OF CORRECTION

PATENT NO. : 6,379,454 B1  
DATED : April 30, 2002  
INVENTOR(S) : John Fellert

It is certified that error appears in the above-identified patent and that said Letters Patent is hereby corrected as shown below:

Column 3,  
Line 29, change "ap" to -- αp --.

Column 4,  
Line 41, change "01" to -- 0.1 --.
Line 61, change "solutions" to -- solution --.

Signed and Sealed this

Twenty-fourth Day of September, 2002

Attest:

JAMES E. ROGAN  
Attesting Officer  *Director of the United States Patent and Trademark Office*